Feb. 7, 1961   L. R. HAYWOOD   2,971,089
RADIOACTIVITY MONITOR
Filed Aug. 11, 1958   3 Sheets-Sheet 2

INVENTOR
LESLIE R. HAYWOOD
BY Smart + Biggar
ATTORNEYS.

![United States Patent Office logo] 2,971,089
Patented Feb. 7, 1961

2,971,089

RADIOACTIVITY MONITOR

Leslie R. Haywood, Peterborough, Ontario, Canada, assignor to Atomic Energy of Canada Limited, Ottawa, Ontario, Canada, a company incorporated Filed Aug. 11, 1958, Ser. No. 754,198

3 Claims. (Cl. 250—43.5)

The invention relates to a radioactivity monitor for the effluent from the coolant tubes of a nuclear reactor.

In the operation of nuclear reactors it is necessary continuously to monitor the effluent from the coolant tubes to determine if there has been any breakdown within the reactor resulting in abnormal increase in radioactivity of the effluent. In the event of an abnormal increase in the radioactivity of the effluent it is important quickly to determine which coolant tube is producing the effluent carrying the increased radioactivity so that steps can be taken to replace the defective part. The need for equipment which would automatically and quickly determine which coolant tube of a reactor is passing effluent of abnormal radioactivity has led to the present invention.

The present invention provides apparatus whereby a flow representative of the effluent from all the coolant tubes of the reactor passes through a radioactivity detector and when an abnormal radioactivity is detected a valve is closed which isolates simultaneous coolant samples from individual coolant tubes. These samples are then scanned automaticaly by a counter for abnormal radioactivity. In this way the coolant tube responsible for effluent having abnormal radioactivity can be quickly and positively identified.

A radioactivity monitor according to the invention comprises for each coolant tube a sample pot having an inlet and outlet connection, a sample pipe connected to each coolant tube and adapted to convey a sample of effluent to the inlet connection of the corresponding sample pot, a first radioactivity detector adapted to detect radioactivity of the effluent from all the coolant tubes and having an inlet and an outlet connection, a common inlet pipe connecting the inlet connections of the sample pot, a common outlet pipe connecting the outlet connections of the sample pot, valve means adapted to connect the inlet connection of the detector to the common inlet pipe or to the common outlet pipe, means adapted to return effluent from the outlet connection of the first detector to the coolant tubes, and a second radioactivity detector adapted to scan the sample pots one at a time and to provide an indication of the radioactivity of the effluent in each sample pot. It is preferred to have the sample pots arranged in a circle about the second radioactivity detector and to have radioactivity shielding means encircling the second radioactivity detector. Means are provided to rotate the shielding means so that a window in the shielding means scans the sample pots one at a time upon rotation of the shielding means and in this way the second detector can supply indications of the radioactivity from each sample pot. The invention also provides for control means for the valve means and for the means for rotating the radioactivity shielding means. Operation of the control means is initiated by the first radioactivity detector and the control means is adapted normally to cause the valve means to connect the inlet connection of the first detector to the common inlet pipe of the sample pots, but upon the first radioactivity detector detecting a greater than normal radioactivity to cause the valve means to connect the inlet connection of the first detector to the common outlet pipe and to shut off the connection to the common inlet pipe for a predetermined length of time. The control means is adapted normally to cause the shielding means to be stationary but upon expiration of the predetermined length of time to cause the shielding means to rotate so that the sample pots are scanned one at a time by the second radioactivity detector through the window of the shielding means.

The apparatus according to the invention provides a convenient, quick and accurate way of detecting the existence of a sheath failure in the reactor and of finding the location of the failure. The apparatus is of low cost, and it is simple and automatic in its operation.

The invention will be further described with reference to the accompanying drawings, in which.

Figure 1:
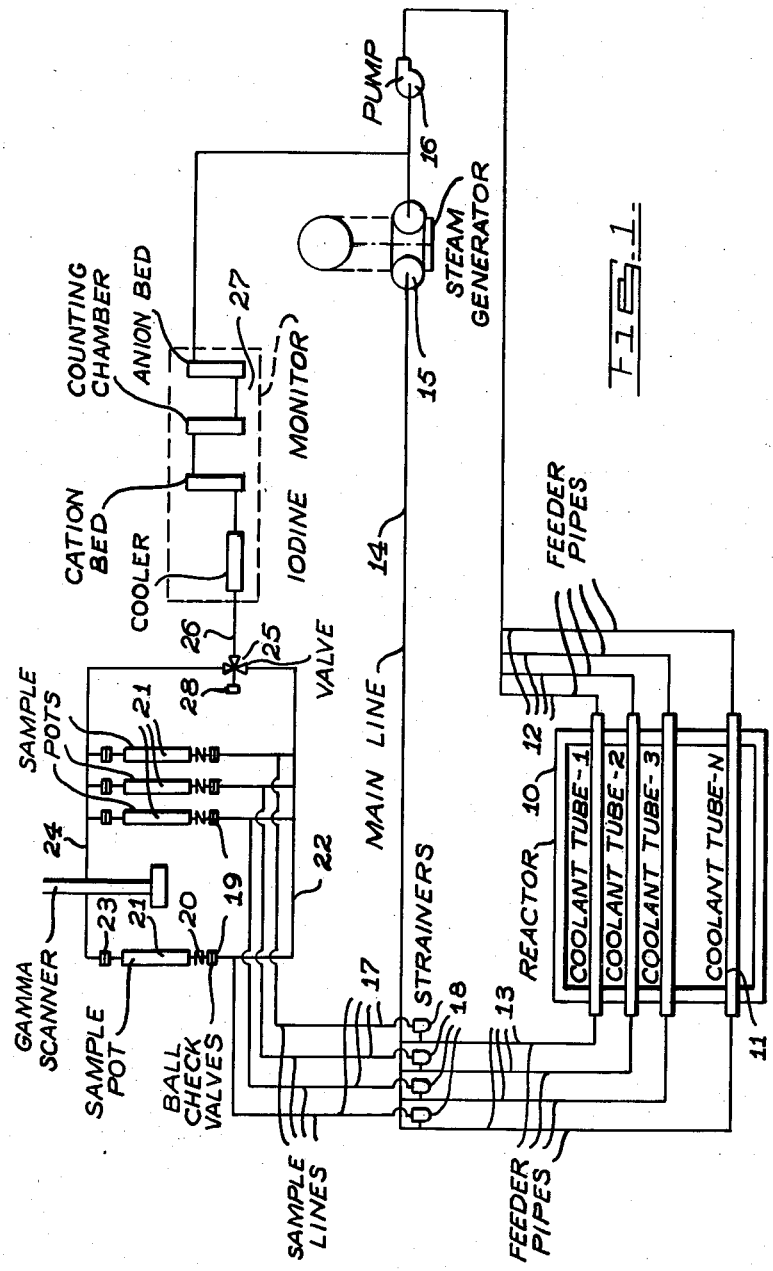
Figure 1 is a schematic flow diagram of apparatus according to the invention.

The construction of the individual components of the apparatus shown schematically in Figure 1 is well known to those skilled in the art. The reactor 10 may have any number N of coolant tubes 11. The feeder pipes for effluent leading into and out of the coolant tubes 11 are designated 12 and 13 respectively. The main line of flow of effluent from the coolant tubes 11 is through the feeder pipes 13 to the main line 14 to a steam generator 15 where heat is extracted from the effluent. A pump 16 is provided to return the effluent to the feeder pipes 12 and to circulate it once more through the coolant tubes 11.

A series of sample lines 17 are individually connected through strainers 18 to the feeder pipes 13. Each sample line 17 connects through a connector 19 and a ball check valve 20 to a sample pot 21. The inlets of the sample pots 21 are interconnected by a common inlet pipe or header 22 and the outlet of each sample pot 21 is connected through a connector 23 to a common outlet pipe or header 24. A three-way valve 25 is connected between the inlet header 22, the outlet header 24 and a connection 26 to a radioactivity detector 27 shown in Figure 1 as an iodine monitor but, of course, other known fission product emitters of radioactivity may form the source detected. The valve 25 is provided with a control solenoid 28 of which the operation will be described below in connection with Figure 5 of the drawings. The iodine monitor 27 is of conventional construction and is familiar to those skilled in this art. As shown in Figure 1 the iodine monitor 27 comprises a cooler, a cation bed, a counting chamber and an anion bed.

Figure 2:
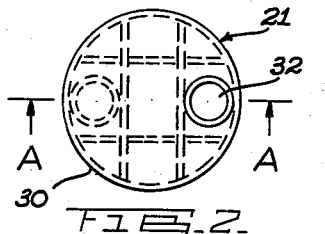
Figure 2 is a plan view of one of the sample pots shown in Figure 1.
Figure 3:
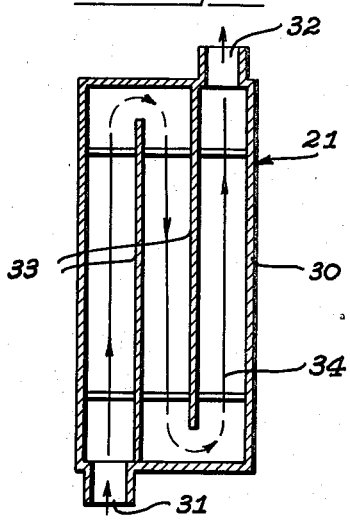
Figure 3 is a cross-sectional view of the sample pot shown in Figure 2 taken on the line A—A.

Details of the structure of the sample pots 21 are shown in Figures 2 and 3. Each sample pot 21 comprises an outer casing 30 having an inlet opening 31 and an outlet opening 32. Baffles 33 are arranged internally of the sample pot to guide the flow of effluent through the sample pot 21 in such a manner as to reduce the time required to establish a complete change of sample of the effluent. The broken line 34 in Figure 3 indicates the path of travel of the effluent through a sample pot 21.

Figure 4:
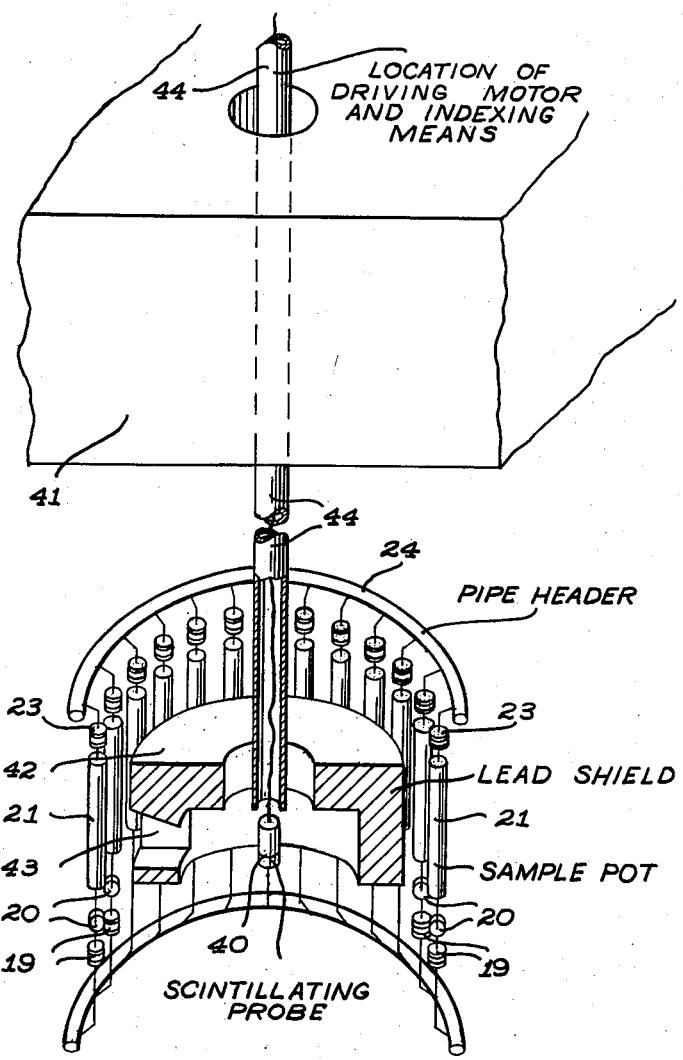
Figure 4 is a schematic drawing showing details of the scanning and sampling arrangement of the apparatus shown in Figure 1.

Figure 4 shows an example of how the sample pots 21 may be arranged for scanning one at a time by a radioactivity detector 40. The sample pots 21 are arranged in a circular array of about four feet in diameter. If desired two or more arrays may be used so that the diameter of the arrays may be reduced. A nuclear counter 40 is suspended at the centre of the array of sample pots 21 from the room above of which the floor is represented in the drawing by a concrete slab 41. An annular lead shield 42 surrounds the detector 40 and has a window 43 just large enough to permit direct radiation from one sample pot 21 at a time to reach the detector 40. The lead shield 42 is supported from below on a suitable thrust bearing (not shown) and may be rotated from the room above by means of a hollow shaft 44. The detector 40 is suspended through the inside of the hollow shaft 44. When scanning is initiated manually or automatically the lead shield 42 begins to rotate intermittently stopping the window 43 opposite each sample pot 21 long enough to permit the activity in the sample pot 21 to be measured. The position of the scanner for identification of the sample being tested is determined by an indexing mechanism (not shown) on the gear drive for the lead shield 42 located in the room above the floor 41. The arrangement is such that the counter 40 may be withdrawn through the hollow shaft 44 for servicing at any time even during operation of the appartaus. If desired the array of sample pots 21 may have one sample pot position where a calibrating source of radioactivity may be installed for check purposes.

The iodine monitor 27 (Figure 1) may be located in the same room as the sample pots 21 (Figure 4) but of course adequate shielding of the counting chamber and the anion bed must be used to protect the counter positions against background radiation from the arrays of sample pots 21. Counting equipment is required for each array of sample pots 21 when multiple arrays are used and a counter may be used in either the counting chamber or anion bed of the iodine monitor 27 (Figure 1). The window of a single channel analyser type of counting equipment may be adjusted in with and level to accept pulses due only to gammas in the energy range of 1 to 1.5 m.e.v. The count will thus be due primarily to the $I^{135}$ fraction of the fission products.

Figure 5:
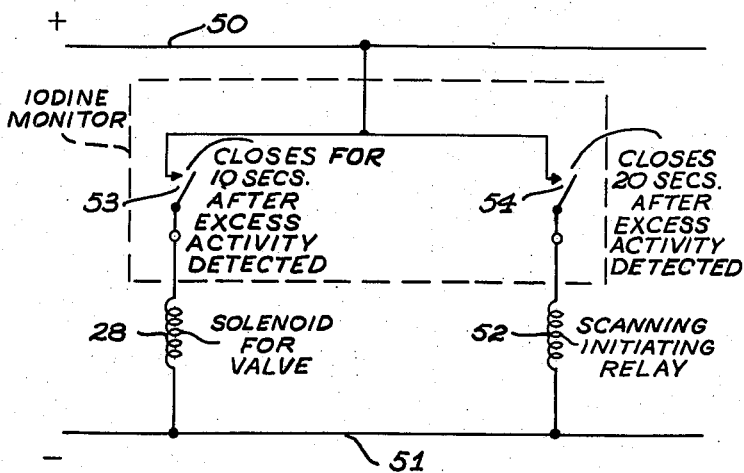
Figure 5 is a schematic circuit diagram of the electrical control circuit for the apparatus shown in Figure 1.

Figure 5 shows a schematic electric connection diagram of the control circuit for the coolant activity monitor. Connections 50 and 51 are provided from a source of direct current suitable for operation of the solenoid 28 of the valve 25 (Figure 1) and the scanning initiating relay 52 which is located with the driving motor and indexing equipment in the room above the floor 41 in Figure 4. The iodine monitor 27 controls two switch contacts 53 and 54 which are arranged to close at predetermined intervals after excess activity is detected. The contacts 53, for example, close for ten seconds after excess activity is detected and the contacts 54 close 20 seconds after excess activity is detected. In the general case, the timing of contacts 53 depends on the size of the sample pots while the timing of the contacts 54 depends on the number of sample pots and the time required for inspection of a single sample pot. The contacts 53 upon closing energize the solenoid 28 for the valve 25 (Figure 1), while the contacts 54 upon closing energize the scanning initiating relay which initiates the scanning of the sample pots 21 by the detector 40 (Figure 4).

The operation of the apparatus may be understood by reference to the schematic diagram of Figure 1 and to the other figures which show details of the apparatus. The operation will now be described with reference to particular examples of equipment which will help to make the explanation clearer although other designs may be used. The sample lines 17 shown in Figure 1 for example may be .125 inch inside diameter sample lines of about 50 feet in length. The transport time to the sample pots 21 will be about 30 seconds. The flow rate is about 240 cubic centimetres per minute per line. The lines 17 are protected from plugging by strainers 18 at the connection to the feeder pipes 13. The sample pots may be fabricated from 1 inch tubing about 4 inches long. A ball check valve 20 is an integral part of each sample pot 21. The volume of each sample pot 21 may be about 7 cubic centimetres per inch of length. Internal baffles as shown in Figure 3 are used to reduce the time required to establish a complete change of sample within each sample pot 21. The pressure drop across the steam generator is for example 21 p.s.i. The valve 25 is a three-way solenoid operated valve connected so that the total sampling flow may be drawn through the sample pots 21 or may by-pass them. The total sampling flow is about 7 imperial gallons per minute passing through the iodine monitor 27 and is returned to the main coolant stream at the suction of the primary coolant pump 16.

The iodine monitor 27 consists of a cooler, a cation exchange bed, monitoring chamber and anion exchange bed connected in series. The gamma scintillation counter is normally situated in the counting chamber but may be moved to the anion bed. The activity seen in the counting chamber is due to the instantaneous iodine fission product fraction. The activity in the anion exchange bed is due to the time integrated iodine fission product fraction.

Under normal operating conditions the total sampling flow by-passes the sample pots 21. When the iodine monitor 27 detects a significant increase in iodine activity, the valve 25 is operated so that the sampling flow is drawn through the sample pots 21. After a time sufficient to establish a nearly complete change in the sample pots 21, the valve 25 returns to the by-pass position. This time is about 10 seconds. The transport time from the sampling array to the iodine counting chamber is less than 20 seconds. In this manner simultaneous samples from all coolant tubes are isolated in the sample pots 21. These samples are representative of the effluents from the coolant tubes at a time from 20 to 30 seconds after the event which caused the increase in activity seen by the iodine monitor 27. In this way the increase in radioactivity of the effluent is quickly detected and the source of the increased radioactivity quickly located.

What I claim as my invention is:

1. A radioactivity monitor for the effluent from coolant tubes of a radioactive reactor, comprising for each coolant tube a sample pot having an inlet and an outlet connection, a sample pipe connected to each coolant tube and adapted to convey a sample of effluent to the inlet connection of the corresponding sample pot, a first radioactivity detector adapted to detect radioactivity of said effluent and having an inlet and an outlet connection, a common inlet pipe connectiing the inlet connections of the sample pots, a common outlet pipe connecting the outlet connections of the sample pots, valve means adapted to connect the inlet connection of the first radioactivity detector to said common inlet pipe or to said common outlet pipe, means adapted to return effluent from the outlet connection of the first radioactivity detector to said coolant tubes, and a second radioactivity detector adapted to scan said sample pots one at a time and to provide an indication of the radioactivity of the efffluent in each sample pot.

2. A radioactivity monitor as claimed in claim 1 in which the sample pots are arranged in a circle about the second radioactivity detector and comprising, radioactivity shielding means encircling the second radioactivity detector between the second radioactivity detector and the sample pots, means adapted to rotate said shielding means, said shielding means having a window for scanning said sample pots one at a time upon rotation of said shielding means so that the second detector can supply indications of the radioactivity from each sample pot.

3. A radioactivity monitor as claimed in claim 2 comprising control means for the valve means and for the means for rotating the radioactivity shielding means, operation of said control means being controlled by the first radioactivity detector, said control means being adapted normally to cause said valve means to connect the inlet connection of the first radioactivity detector to the common inlet pipe of the sample pots but upon the first radioactivity detector detecting a greater than normal radioactivity to cause said valve means to connect the inlet connection of the first radioactivity detector to the common outlet pipe and to shut off the connection to the common inlet pipe for a predetermined length of time, said control means being adapted normally to cause said shielding means to be stationary but upon expiration of said predetermined length of time to cause said shielding means to rotate so that the sample pots are scanned one at a time by the second radioactivity detector through the window of said shielding means.

References Cited in the file of this patent

UNITED STATES PATENTS 2,738,426   Hurst _____ Mar. 13, 1956